Oct. 12, 1943.   H. R. ELLINWOOD   2,331,668
SUPPORTING AND BONDING DEVICE
Filed Jan. 23, 1942
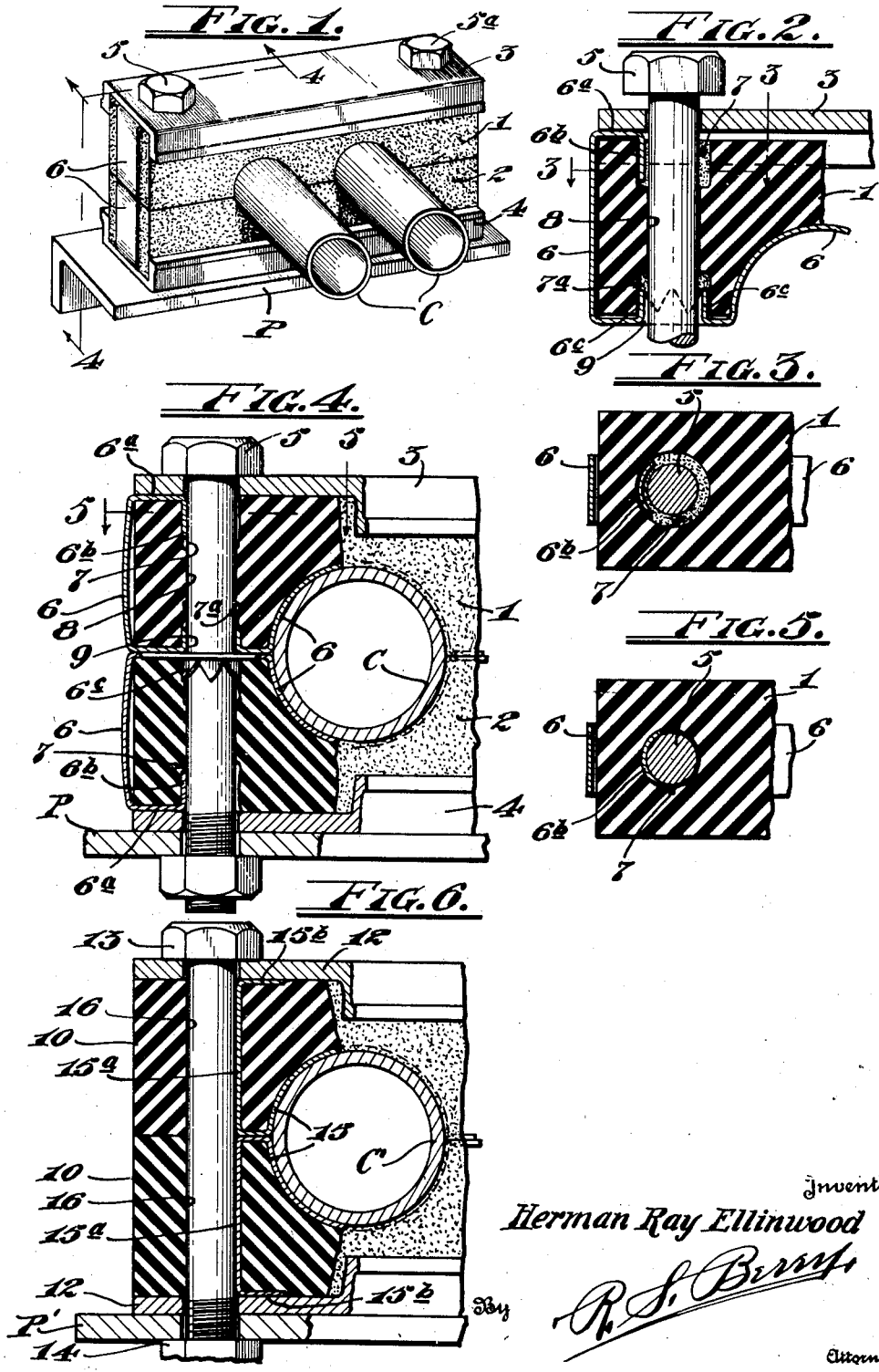
Inventor
Herman Ray Ellinwood
Attorney Patented Oct. 12, 1943

2,331,668

UNITED STATES PATENT OFFICE 2,331,668

SUPPORTING AND BONDING DEVICE

Herman Ray Ellinwood, Burbank, Calif., assignor to Adel Precision Products Corp., a corporation of California Application January 23, 1942, Serial No. 427,884

11 Claims. (Cl. 174—135)

This invention relates to aircraft conduit supporting devices of the type shown in the United States Letters Patent Number 2,227,528, issued to Paul W. Adler on January 7, 1941, wherein a block of resilient insulation material provides a cushioned, vibration-absorbing seat for a group of metallic conduits and is equipped with means for electrically bonding the conduits to a metallic structural part of an aircraft on which the device is mounted.

An object of the present invention is to provide a device of the character described in which a metallic bonding element is associated with the cushion and a metallic fastening means in a particular manner for the purpose of more effectively maintaining said element in "bonding" contact with the conduits and the metallic fastening means and preventing such mutilation, derangement and impairment of said element as heretofore has been occasioned in assemblying the device.

Another object of this invention is to provide a conduit supporting and bonding device such as described wherein a resilient cushion block is formed with bolt holes of such character and the bolts related thereto in such manner that portions of the metallic bonding strip may be disposed for anchorage in said bolt holes without being mutilated or deranged when the bolts are inserted through said holes, and said portions will be forced by the expanding material of the block, into and maintained in tensioned "bonding" contact with said bolts and securely anchored in said holes, when the cushion block is placed under compression and clamped on the conduits.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a device embodying my invention as when in use;

Fig. 2 is an enlarged fragmentary sectional view of a part of the device of my invention showing the manner of fitting the bonding strip in the bolt holes and the manner of inserting the bolts without damaging the strip, while the cushion blocks are not under compression;

Fig. 3 is a fragmentary sectional view taken on the line 3—3 of Fig. 2;

Fig. 4 is a fragmentary sectional view taken on the line 4—4 of Fig. 1;

Fig. 5 is a fragmentary sectional view taken on the line 5—5 of Fig. 4;

Fig. 6 is a fragmentary sectional view of a modified form of my invention.

Referring to the drawing more specifically it is seen that one form of my invention generally includes a cushioned, conduit supporting means in this instance made up of opposed blocks 1 and 2 of elastic insulation material for supporting conduits C therebetween.

Backing means here shown in the form of two rigid metal channel members 3 and 4 are mounted on the outer edges of the blocks 1 and 2. This backing means forms a part of the metallic means for clamping the blocks on the conduits, which includes bolts 5 and 5a, the bolts being passed through the backing members 3 and 4 and metallic structural part P of an aircraft. Metallic electrically conductive flexible bonding strips 6 are arranged to be held by the cushion blocks when the latter are compressed by the clamping means, in "bonding" contact with the bolts and conduits and also in contact with the backing members 3 and 4.

It is now apparent that a cushioned, vibration-absorbing and insulated support is provided to reduce vibration and wear and other failure of the conduit lines where the latter are necessarily supported on the metallic structure of the airplane, while the bonding means, including the bonding strip and bolts and also the backing members, operate to harmlessly discharge static electricity which may be generated in the conduit lines, into said metallic structure.

In accordance with the present invention, the bonding strips are inserted into bolt holes in the cushion for the purpose of making a good bonding connection with the bolts and also effectively anchoring the strip on the cushion. To make this possible while eliminating all possibility of the bolts crowding against and damaging, impairing or deranging the portions of the bonding strips in the holes when the bolts are inserted, said holes are formed of such large diameter where the strips are contained therein, that the bolts will pass freely by the strip. However the relative arrangement of the strips, holes and bolts are such that upon effectively clamping and compressing the cushions on the conduits by means of the bolts and backing members the elastic material of the cushions will crowd and hold the strip against the bolts within said bolt holes to insure a reliable electrical connection of the bolts and the bonding strips.

As here shown the cushions 1 and 2 have complementary conduit receiving channels extending transversely in their opposed faces and the bonding strip 6 extend between said faces and into the channels. The strips 6 extend around the ends of the cushion blocks 1 and 2 with portions 6a thereof lying between the cushion blocks and the channeled backing members 3 and 4, while the ends 6b of the strips extend into enlargements 7 of bolt holes 8 in said blocks.

Inasmuch as the strip 6 are formed of thin, highly flexible and fragile metal as is necessary to prevent impairment of the cushioning action and undue wear on the conduits while insuring the desired conductivity, it is seen that upon inserting the bolts 5 into holes as would be ordinarily provided in the blocks, the strip would be crowded and mutilated, deranged or impaired by said bolts. This is prevented by counter-boring or enlarging the bolt holes as at 7 and is further prevented by pre-forming the portions 6b of the strip with a transverse curvature to make it conform to and lie close against the walls of the enlargements. Moreover this curvature causes the strip portions 6b to closely conform to the bolts and make a more effective bonding contact therewith without the distortion which would otherwise occur when the cushion blocks are compressed and clamped on the conduits, and the material of said blocks crowds said portions of the strip against said bolts.

Where, as here shown the bonding strips 6 are provided with bolt openings 9 in the portions thereof disposed between the opposed faces of the cushion blocks, and said openings may be formed by striking or punching out tongues 6c into enlargements or counter-bores 7a at the inner ends of the bolt holes 8 in the cushion blocks. This may be done with a suitable punching tool not shown and the tongues 6c may be curved transversely as are the ends 6b and for the same purpose.

With reference to the ends 6b and tongues 6c of the strip 6 it is seen that in being disposed in out-of-the-way position in the enlargements 7 and 7a respectively of the bolt holes 8, the bolts may be inserted without damaging or deranging the strip, yet when the cushion blocks are compressed and clamped on the conduits the material of the blocks will expand so as to crowd the ends 6b and tongues 6c into close contact with the bolts and also force the portions 6a into similar contact with the backing members 3 and 4, thus insuring an effective bonding action at all times.

Figs. 2 and 3 show the relation of the bolt and strip portions 6b in the bolt holes 8 of the cushions 1 and 2 before the cushions are clamped and placed under compression, the portions 6b being then spaced from the bolts, whereas Figs. 4 and 5 show the cushion blocks compressed and the portions 6b forced by the expansion of the material of the cushions against the bolts.

A modified form of this invention shown in Fig. 6 includes cushion blocks 10, metal backing members 12, bolts 13, nuts 14 and bonding strips 15 corresponding in construction and arrangement to similar parts shown in Figs. 1 to 5 and for holding conduits C' on the metallic structural part P' of an aircraft in the manner hereinbefore described. In this form however the bonding strips 15 have intermediate portions 15a extended through the bolt holes 16 from the inner ends of said holes, and end portions 15b which lie between the backing members 12 and the cushions. Otherwise these bonding strips are disposed to contact the conduits in the same manner as shown in Figs. 1 to 5.

The bolt holes 16 are enlarged throughout to an extent compared to the diameter of the bolts, so that the portions 15a of the strips will escape being forcibly engaged and mutilated or deranged when the bolts are inserted through said holes. Moreover the portions 15a may be curved transversely to conform to and lie close against the walls of the bolt holes and also effect a better contact with the bolts. In this form as in the other form the material of the cushions will expand, when the cushions are compressed and clamped on the conduits, and crowd the portions 15a against the bolts to form a reliable "bonding" contact therewith.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a conduit supporting and bonding device, a block of elastic material for supporting a group of metallic conduits, said block having bolt holes therein, metallic means for securing said block on a group of conduits and placing the block under compression, including bolts passing through said holes and a metallic bonding strip arranged on said block with portions disposed for contact with said conduits and another portion extended into one of said bolt holes, the portion of the bolt hole into which the strip extends being of such greater diameter than the bolt that the bolt may be inserted therethrough without crowding against and mutilating or deranging the portion of the strip therein; the material of the block when the block is placed under compression acting to crowd the portion of the strip in said hole into contact with said bolt and to maintain the strip in bonding contact with said bolt.

2. In a conduit supporting and bonding device, a block of elastic material for supporting a group of metallic conduits, said block having bolt holes therein, metallic means for securing said block on a group of conduits and placing the block under compression, including bolts passing through said holes and a metallic bonding strip arranged on said block with portions disposed for contact with said conduit and another portion extended into one of said bolt holes, the portion of the bolt hole into which the strip extends being of such greater diameter than the bolt that the bolt may be inserted therethrough without crowding against and mutilating or deranging the portion of the strip therein; the material of the block when the block is placed under compression acting to crowd the portion of the strip in said hole into contact with said bolt and to maintain the strip in bonding contact with said bolt, said metallic means also including a rigid metallic backing means through which said bolts extend and which contact the bonding strip.

3. In a conduit supporting and bonding device, a block of elastic material providing a cushioned seat for a plurality of metallic conduits, said block having a bolt hole therein, means for securing said block under compression on said conduits including a metallic backing means and a bolt passing through said backing means and said bolt hole, said bolt and metallic backing means being one of them adapted to be secured in contact with a metallic structural part of an airplane, and an electrically conductive flexible bonding strip having portions held by the block in contact with said conduits and a portion extended into said bolt hole, the portion of the bolt hole which receives said strip being of such larger diameter than the bolt that the latter may be inserted through said hole without crowding against and mutilating or deranging said strip, the material of the block when the latter is compressed acting to force and hold the strip against said bolt, the portion of the strip engaged in said hole being preformed of arcuate cross section to conform to the bolt and bolt hole.

4. In a conduit supporting and bonding device, a block of elastic material providing a cushioned seat for a plurality of metallic conduits, said block having a bolt hole therein, means for securing said block under compression on said conduits including a metallic backing means and a bolt passing through said backing means and said bolt hole, said bolt and metallic backing means being one of them adapted to be secured in contact with a metallic structural part of an airplane, and an electrically conductive flexible bonding strip having portions held by the block in contact with said conduits and a portion extended into said bolt hole, the portion of the bolt hole which receives said strip being of such larger diameter than the bolt that the latter may be inserted through said hole without crowding against and mutilating or deranging said strip, the material of the block when the latter is compressed acting to force and hold the strip against said bolt, and another portion of said strip held by said block in contact with said metallic backing means.

5. In a conduit supporting and bonding device, a block of elastic insulation material providing a cushioned seat for a group of metallic conduits, said block having bolt holes therein, means for clamping said block under compression on said group of conduits, including bolts passing through said holes, at least one of said bolts being adapted to contact a metallic structural part of an aircraft, an electrically conductive flexible bonding strip arranged with portions held by the block in contact with said conduits, and another portion extending into one of said bolt holes, said one bolt hole having an enlargement receiving said portion of the strip so that a bolt may be inserted through said one hole without crowding against and mutilating or deranging the portion of the strip therein, the enlargement being such that when the block is compressed the material thereof will crowd the strip against the bolt and maintain it in contact therewith the portion of the strip extended into said enlarged part of the bolt hole being transversely curved before the bolt is inserted so as to conform to the curvature of the bolt hole and bolt and lie in out-of-the-way position prior to the placing of the block under compression.

6. In a conduit supporting and bonding device, a block of elastic material providing a cushioned seat for a group of metallic conduits, said block having a bolt hole therein, means for securing said block under compression on said conduits including a rigid metallic backing means and a bolt contacting said backing means and extending through said hole, said bolt and backing means being one of them adapted to contact a metallic structural part of an aircraft, a metallic flexible bonding strip having conduit engaging portions and an end portion extended into said hole, the material of the block acting when the block is compressed to force and hold said end portion of the strip against said bolt, and an intermediate portion of said strip extended into said hole and subject to being forced into contact with the bolt when the block is compressed.

7. In a conduit supporting and bonding device, a block of elastic material providing a cushioned seat for a group of metallic conduits, said block having a bolt hole therein, means for securing said block under compression on said conduits including a rigid metallic backing means and a bolt contacting said backing means and extending through said hole, said bolt and backing means being one of them adapted to contact a metallic structural part of an aircraft, a metallic flexible bonding strip having conduit engaging portions and an end portion which latter is extended into said hole, the part of the hole receiving said end portion of the strip being enlarged, the material of the block acting when the block is compressed to force and hold said end portion of the strip against said bolt, said bolt hole having another enlarged part, said strip also having an intermediate portion extended the other enlarged part of said hole at which point the intermediate portion of the strip is also forced into contact with the bolt when the block is compressed and another portion of said strip held by the block in contact with said backing means.

8. In a conduit supporting and bonding device, opposed elongated blocks of elastic insulation material having opposed faces providing cushioned seats for a group of conduits, said blocks having bolt holes therein, means for clamping said blocks under compression on said conduits including rigid metallic backing means and bolts contacting said backing means and extending through said bolt holes, and a flexible metallic bonding strip having portions extending between said cushions for contact with said conduits, and portions extended into said bolt holes, said bolt holes being enlarged where said last named portions of the strip are extended therein, the material of the cushion blocks acting when the blocks are clamped under compression on said conduits, to force and hold said last named portions of said strip against said bolts.

9. In a conduit supporting and bonding device, opposed elongated blocks of elastic insulation material having opposed faces providing cushioned seats for a group of conduits, said blocks having bolt holes therein, means for clamping said blocks under compression on said conduits including rigid metallic backing means and bolts contacting said backing means and extending through said bolt holes, and a flexible metallic bonding strip having portions extending between said cushions for contact with said conduits, and portions extended into said bolt holes, said bolt holes being enlarged where said last named portions of the strip are extended therein, the material of the cushion blocks acting when the blocks are clamped under compression on said conduits, to force and hold said last named portions of said strip against said bolts, and other portions of said strip held by said blocks in contact with said backing means.

10. In a conduit supporting and bonding device, opposed elongated blocks of elastic insulation material having opposed faces providing cushioned seats for a group of conduits, said blocks having bolt holes therein, means for clamping said blocks under compression on said conduits including rigid metallic backing means and bolts contacting said backing means and extending through said bolt holes, and a flexible metallic bonding strip having portions extending between said cushions for contact with said conduits, and portions extended into said bolt holes, said bolt holes being enlarged where said last named portions of the strip are extended therein, the material of the cushion blocks acting when the blocks are clamped under compression on said conduits, to force and hold said last named portions of said strip against said bolts; the enlarged portions of the bolt holes being located at the ends of said holes.

11. In a conduit supporting and bonding device, opposed elongated blocks of elastic insulation material having opposed faces providing cushioned seats for a group of conduits, said blocks having bolt holes therein, means for clamping said blocks under compression on said conduits including rigid metallic backing means and bolts contacting said backing means and extending through said bolt holes, and a flexible metallic bonding strip having portions extending between said cushions for contact with said conduits, and portions extended into said bolt holes, said bolt holes being enlarged where said last named portions of the strip are extended therein, the material of the cushion blocks acting when the blocks are clamped under compression on said conduits, to force and hold said last named portions of said strip against said bolt, the portions of the strip which extend into said holes being respectively the terminals of said strip and portions punched out from said strip to form bolt receiving openings in the strip.

HERMAN RAY ELLINWOOD.